(12) United States Patent
Katagiri et al.

(10) Patent No.: US 9,087,549 B2
(45) Date of Patent: Jul. 21, 2015

(54) APPARATUS AND METHOD FOR CONTROLLING TRANSPORTATION OF TAPE MEDIUM

(71) Applicant: International Business Machines Corporation, Armonk, NY (US)

(72) Inventors: Takashi Katagiri, Kanagawa (JP); Yuhko Mori, Kanagawa (JP); Yutaka Oishi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/526,523

(22) Filed: Oct. 29, 2014

(65) Prior Publication Data
US 2015/0124349 A1    May 7, 2015

Related U.S. Application Data

(63) Continuation of application No. 13/510,608, filed as application No. PCT/JP2010/066790 on Sep. 28, 2010, now Pat. No. 8,913,337.

(30) Foreign Application Priority Data

Dec. 22, 2009    (JP) ................................ 2009-291515

(51) Int. Cl.
| | |
|---|---|
| *G11B 15/46* | (2006.01) |
| *G11B 15/48* | (2006.01) |
| *G11B 15/44* | (2006.01) |
| *G06F 3/06* | (2006.01) |

(52) U.S. Cl.
CPC ............ *G11B 15/442* (2013.01); *G06F 3/0613* (2013.01); *G06F 3/0656* (2013.01); *G06F 3/0682* (2013.01); *G06F 2003/0691* (2013.01)

(58) Field of Classification Search
None
See application file for complete search history.

(56) References Cited

U.S. PATENT DOCUMENTS

| | | | |
|---|---|---|---|
| 6,856,479 | B2 | 2/2005 | Jaquette et al. |
| 6,865,043 | B2 | 3/2005 | Ataku et al. |
| 7,218,468 | B2 | 5/2007 | Jauette et al. |

(Continued)

FOREIGN PATENT DOCUMENTS

| | | |
|---|---|---|
| CN | 1568520 | 1/2005 |
| EP | 1886491 | 2/2008 |

(Continued)

OTHER PUBLICATIONS

English machine translation of JP2008-252852 published Oct. 16, 2008 by Sanyo Electric Co. Ltd.

(Continued)

*Primary Examiner* — K. Wong
(74) *Attorney, Agent, or Firm* — David W. Victor; Konrad Raynes Davda & Victor LLP (57) ABSTRACT

An apparatus, computer readable medium device, and method for controlling transportation of a tape medium. A determination is made whether to execute a backhitch operation in response to writing a data set to tape from the buffer. If not, a determination is made whether a transaction size at which data is transferred from the buffer to the tape is less than a buffer size. If so, then a determination is made of a a new speed and whether a current speed is different from the determined new speed. If so, then a backhitch is initiated.

21 Claims, 7 Drawing Sheets

(56) References Cited

U.S. PATENT DOCUMENTS

| | | | |
|---|---|---|---|
| 7,350,021 B2 | 3/2008 | Itagaki et al. | |
| 7,496,696 B2 | 2/2009 | Katagiri et al. | |
| 7,631,141 B2 | 12/2009 | Watanabe | |
| 7,903,363 B2 | 3/2011 | Itagaki et al. | |
| 8,035,912 B2 * | 10/2011 | Katagiri et al. | 360/73.08 |
| 8,219,830 B2 | 7/2012 | Bates et al. | |
| 2003/0142428 A1 | 7/2003 | Jauette et al. | |
| 2003/0142429 A1 | 7/2003 | Ataku et al. | |
| 2004/0230741 A1 | 11/2004 | Watanabe | |
| 2005/0128625 A1 | 6/2005 | Jaquette et al. | |
| 2006/0204209 A1 | 9/2006 | Blatchley et al. | |
| 2006/0256466 A1 | 11/2006 | Katagiri et al. | |
| 2008/0285166 A1 | 11/2008 | Katagiri et al. | |
| 2012/0293887 A1 | 11/2012 | Abe et al. | |

FOREIGN PATENT DOCUMENTS

| | | |
|---|---|---|
| JP | 03214315 A | 9/1991 |
| JP | 2004341925 | 12/2004 |
| JP | 2006318571 | 11/2006 |
| JP | 200795231 | 4/2007 |
| JP | 2008533636 | 8/2008 |
| JP | 2008252852 | 10/2008 |
| JP | 2009289349 | 12/2009 |
| JP | 5476395 | 4/2014 |
| WO | 2006098797 | 9/2006 |
| WO | 2011058794 | 8/2010 |

OTHER PUBLICATIONS

English machine translation of WO2011-058794 published May 19, 2011 by IBM Corp.

Katagiri, et al., "Improving the Throughput of Write and Synchronous Operations on a Tape Drive", 2008 Performance Engineering Best Practices Conference, Southbury, CT, Jun. 16-18, 2008, pp. 1-24.

English translation of International Search Report dated Dec. 28, 2010 for Application No. PCT/JP2010/066790.

US Patent No. 7,350,021 dated Mar. 25, 2008, is an English language equivalent of JP2007095231 dated Jan. 17, 2007.

US Patent No. 7,496,696 dated Feb. 24, 2009, is an English language equivalent of JP03214315A dated Sep. 19, 1991.

US Patent No. 8,035,912 dated Oct. 11, 2011, is an English language equivalent of JP2009289349A dated Dec. 10, 2009.

IDS Report, Jun. 14, 2013, from the May 28, 2013 Office Action for JP920090096JP2, Total 2 pp.

Rejection, May 28, 2013, for JP920090096JP2, Total 2 pp.

English Abstract and Machine Translation for CN1568520A, published on Jan. 19, 2005, Total 16 pp.

IDS Report, Apr. 25, 20014, for JP920090096CN1, from the CN Office Action dated Apr. 23, 2014, Total 2 pp.

Chinese Office Action 1, Apr. 23, 2014, for JP920090096CN1, Total 35 pp.

US Publication No. 2003/0142428, dated Jul. 31, 2003, is an English language equivalent of CN1568520A, dated Jan. 19, 2005.

US Publication No. 2003/0142429, dated Jul. 31, 2003, is an English language equivalent of CN1568520A, dated Jan. 19, 2005.

US Publication No. 2005/0128625, dated Jun. 16, 2005, is an English language equivalent of CN1568520A, dated Jan. 19, 2005.

US Patent No. 6,856,479, dated Feb. 15, 2005, is an English language equivalent of CN1568520A, dated Jan. 19, 2005.

US Patent No. 6,865,043, dated Mar. 8, 2005, is an English language equivalent of CN1568520A, dated Jan. 19, 2005.

US Patent No. 7,218,468, dated May 15, 2007, is an English language equivalent of CN1568520A, dated Jan. 19, 2005.

US2012293887 is an English language counterpart of WO2011058794 dated May 19, 2011.

English translation of JP5476395 dated Apr. 23, 2014.

English translation of WO2011058794 dated May 19, 2011.

Office Action dated Oct. 22, 2013, pp. 18, for U.S. Appl. No. 13/510,608, filed May 17, 2012.

Response dated Jan. 22, 2014, pp. 10, to Office Action dated Oct. 22, 2013, pp. 18, for U.S. Appl. No. 13/510,608, filed May 17, 2012.

Notice of Allowance dated Mar. 25, 2014, pp. 5, for U.S. Appl. No. 13/510,608, filed May 17, 2012.

Notice of Allowance dated Aug. 6, 2014, pp. 9, for U.S. Appl. No. 13/510,608, filed May 17, 2012.

* cited by examiner

| SPx | S(x) | R(x) |
|-----|------|------|
| SP1 | 6.0[m/sec] | 120[MB/sec] |
| SP2 | 5.0[m/sec] | 100[MB/sec] |
| SP3 | 4.0[m/sec] | 80[MB/sec] |
| SP4 | 3.0[m/sec] | 60[MB/sec] |
| SP5 | 2.0[m/sec] | 40[MB/sec] |

APPARATUS AND METHOD FOR CONTROLLING TRANSPORTATION OF TAPE MEDIUM

CROSS-REFERENCE TO RELATED APPLICATIONS

This application is a continuation of U.S. patent application Ser. No. 13/510,608, filed May 17, 2012, which is the National Stage of International Application No. PCT/JP2010/066790, filed Sep. 28, 2010, which claims priority from Japanese Patent Application No. 2009-291515, filed Dec. 22, 2009, wherein all the above related applications are all incorporated herein by reference in their entirety.

BACKGROUND OF THE INVENTION

1. Field of the Invention

The present invention relates to an apparatus and a method for controlling transportation of a tape medium. In particular, the present invention relates to an apparatus and a method for controlling transportation of a tape medium during data writing to the tape medium.

2. Description of the Related Art

During data writing, some tape drives write data to tape media, such as magnetic tapes, in conformity with LTO (Linear Tape Open), for example, by receiving synchronization commands from a host (an application program) at regular or sporadic time intervals. The synchronization command is a command to forcedly write data accumulated in a buffer in a tape drive to a tape medium. Such regular reception of synchronization commands assures an application program that all data sent to the tape drive by the application program itself is already written to the tape medium and is not left any more in the buffer in the tape drive.

When the tape drive receives a synchronization command, the buffer inside the tape drive becomes empty, and the tape medium is transported idly without data to be written. In order to keep an interval between recorded datasets, the tape drive usually performs "backhitch." The backhitch is a series of operations including stopping the transportation of the tape medium once by reducing the transport speed of the tape medium, transporting the tape medium in a reversed direction, thereafter transporting the tape medium again in the original direction until a location of the tape medium targeted for writing arrives, and then writing next data to the location. This backhitch usually requires a time of approximately two or three seconds. Since the writing of next data starts after completion of this backhitch, frequent reception of synchronization commands leads to considerable reduction in writing performance.

To address this, there have been heretofore proposed techniques of writing without execution of backhitch (for example, see Japanese Patent Application Publication Nos. 2006-318571, 2004-341925, 2008-533636).

Japanese Patent Application Publication No. 2006-318571 describes an apparatus including a host I/F unit to store a dataset sent from a host into a buffer memory, as well as to take out a dataset stored in the buffer memory and to send the dataset to the host, and a medium I/F unit to take out a dataset stored in the buffer memory and to transfer the dataset to a tape, as well as to store a dataset read from a tape into the buffer memory. The apparatus acquires a transfer rate with the host from the host I/F unit, acquires an error rate in writing to the tape from the medium I/F, determines a tape speed based on the transfer rate and the error rate, and performs control to transport the tape with the determined speed.

Japanese Patent Application Publication No. 2004-341925 describes a storage apparatus to sequentially write multiple sets of write data to a data recording medium in segment units of a predetermined size. For each of sets of write data, the storage apparatus writes the set of write data to at least one segment of the data recording medium when the set of write data is received in association with a write command to write the set of write data to the data recording medium. In the case where the size of one set of write data is smaller than a prescribed size that is determined in advance, the storage apparatus concatenates the one set of write data and multiple sets of write data written after the one set of write data, among the multiple sets of write data sequentially written to the data recording medium, and then writes the concatenated sets of write data to a smaller number of segments than the number of segments originally required to write the sets of write data targeted for the concatenation. In addition, according to Japanese Patent Application Publication No. 2004-341925, the storage apparatus performs backhitchless flush of writing write data to a tape recording medium without executing backhitch, and thereby operates with a higher speed than in the case of executing the backhitch.

Japanese Application Publication No. 2008-533636 describes a helical scan tape recorder including a rotatable scanner, and a transport system for transporting a magnetic tape to a position proximate to the rotatable scanner in such a manner that information can be recorded during a revolution of the scanner. In the helical scan tape recorder, a controller performs, as a pause routine for pausing during a recording operation on the tape, the steps of: determining a tape pause position reference value indicative of a pre-pause last recording position on the tape; recording an erase signal on the tape after the pre-pause last recording position; rewinding the tape; transporting the tape in a forward direction and obtaining a current tape position value; determining when the current tape position value reaches a predetermined value relative to the tape pause position reference value; and at beginning of a next revolution of the scanner, commencing recording of one or more post-pause stripes on the tape.

One conceivable method of backhitchless writing is to idly transport a tape (transport the tape without writing data) after receiving a synchronization command until next data is ready to be written. However, since a time to write data to the tape is proportional to a tape speed, there is a case where a high tape speed is used to reduce the write time. The use of the high tape speed leads to an increase in the idly-transported length, and thereby causes a problem of lowering the performance in reading.

In contrast, in order to achieve a target value of the performance in reading, there is no way but to make the idly-transported length short, and the backhitch is executed for this purpose. Therefore, a time of entire write processing cannot be reduced in consideration of an occurrence frequency of backhitch and a time required for backhitch.

SUMMARY

Described embodiments enhance performance in writing without preventing achievement of a target read data rate by providing an apparatus of controlling transportation of a tape medium during data writing to the tape medium, comprising a determination unit that determines a speed for transporting the tape medium in a way that a portion of the tape medium transported without data writing due to skipping of backhitch has a length not preventing achievement of a target read data rate in reading written data from the tape medium.

In further embodiments, the determination unit may calculate a first required time and a second required time, the first required time being a time required to write data without backhitch within a range of the tape medium where a predetermined amount of unit data is to be written, the second required time being a time required to write data with backhitch within the range, and determine the speed for transporting the tape medium based on the first required time and the second required time.

In addition, the determination unit may calculate the first required time based on a first count number that indicates the number of times data is writable without backhitch within the range, and calculate the second required time based on a second count number that indicates the number of times data needs to be written with backhitch executed in advance within the range. In this case, the apparatus may further include a storage unit that stores time history information indicating a record of a time after writing of data to the tape medium and before writing of next data thereto, and count history information indicating a record of the number of times data is written in order to write the unit data to the tape medium, and the determination unit may calculate the first count number based on the time history information, and calculate the second count number based on the first count number and the count history information.

Moreover, the determination unit may calculate the first required time based on a first time being a time required to write data without backhitch, and calculate the second required time based on a second time being a time required to execute backhitch and then to write data. In this case, the apparatus may further include a storage unit that stores time history information indicating a record of a time after writing of data to the tape medium and before writing of next data thereto, and data amount history information indicating a record of a data amount written to the tape medium per writing, and the determination unit may calculate the first time based on the time history information and the data amount history information, and calculate the second time based on the data amount history information and a time required for backhitch that is calculated by using a predetermined value.

Further, the described embodiments also provide an apparatus of controlling transportation of a tape medium during data writing to the tape medium, the apparatus including: an acquisition unit that acquires a target read data rate in reading written data from the tape medium; and a determination unit that determines a speed for transporting the tape medium based on a first required time and a second required time, the first required time obtained by multiplying a time required to write data without backhitch and the number of times data is writable without backhitch within a range of the tape medium where a predetermined amount of unit data is to be written in order to achieve the read data rate acquired by the acquisition unit, the second required time obtained by multiplying a time required to execute backhitch and then to write data, and the number of times data needs to be written with backhitch executed in advance within the range in order to achieve the read data rate acquired by the acquisition unit.

The determination unit may calculate a plurality of sums one of which is a sum of the first required time and the second required time corresponding to each of a plurality of speeds of the tape medium, and determine a particular speed as the speed for transporting the tape medium in a case where the sum corresponding to the particular speed is the smallest among the plurality of sums.

Furthermore, the described embodiments may also provide a method of controlling transportation of a tape medium during data writing to the tape medium, the method including the steps of: acquiring a target read data rate in reading written data from the tape medium; and determining a speed for transporting the tape medium in a way that a portion of the tape medium transported without data writing due to skipping of backhitch has a length not preventing achievement of the target read data rate in reading written data from the tape medium.

Still further, the described embodiments also provide a program causing a computer to function as an apparatus of controlling transportation of a tape medium during data writing to the tape medium, the program causing the computer to function as: an acquisition unit that acquires a target read data rate in reading written data from the tape medium; and a determination unit that determines a speed for transporting the tape medium in a way that a portion of the tape medium transported without data writing due to skipping of backhitch has a length not preventing achievement of the target read data rate acquired by the acquisition unit.

The described embodiments provide high performance without preventing achievement of a target read data rate.

DETAILED DESCRIPTION

Hereinafter, embodiments of the present invention will be described in details with reference to the accompanying drawings.

Figure 1:
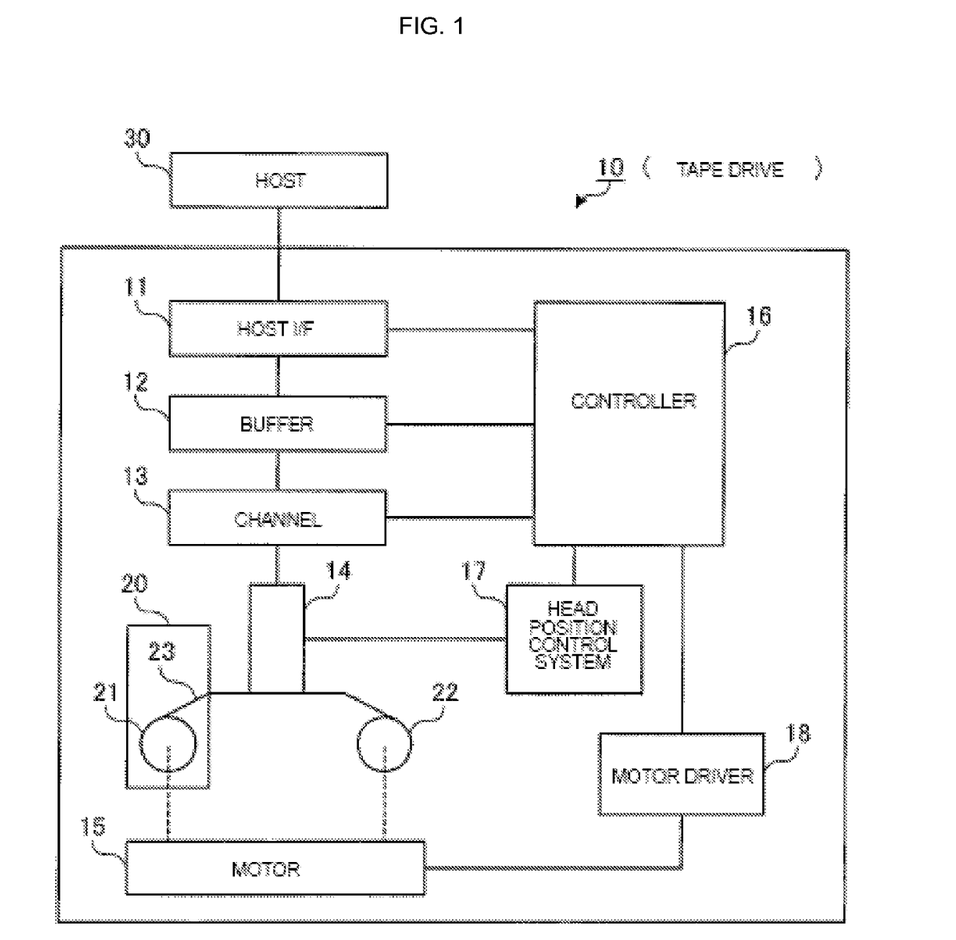
FIG. 1 is a block diagram illustrating a configuration of a tape drive to which embodiments of the present invention are applied.

FIG. 1 is a diagram illustrating a configuration example of a tape drive 10 to which an embodiment of the present invention is applied. This tape drive 10 includes a host interface (hereinafter, referred to as "host I/F") 11, a buffer 12, a channel 13, a head 14, and a motor 15. In addition, the tape drive 10 includes a controller 16, a head position control system 17, and a motor driver 18. Moreover, FIG. 1 also illustrates a tape cartridge 20, because the tape cartridge 20 is mountable in the tape drive 10 by being inserted thereinto. This tape cartridge 20 includes a tape 23 wound around reels 21 and 22. With rotations of the reels 21 and 22, the tape 23 is transported in a longitudinal direction, i.e., in a direction from the reel 21 to the reel 22 or a direction from the reel 22 to the reel 21. Note that, a magnetic tape is illustrated as the tape 23, but any tape medium other than the magnetic tape is usable.

Here, the host I/F 11 communicates with a host 23 that is an example of an upper level apparatus. For example, the host I/F 11 receives a command to write data to the tape 23, a command to read data from the tape 23, a command to transport the tape 23 to a target location, and a command to forcedly write data accumulated in the buffer 12 to the tape 23 (a synchronization command). Here, SCSI is illustrated as a communication standard used by the host I/F 11. In the case of SCSI, the first command corresponds to a Write command, the second command corresponds to a Locate command or a Space command, the third command corresponds to a Read command, and the fourth command corresponds to a WriteFM non-immediate command. In addition, the host I/F 11 returns to the host 30 a reply indicating a success or failure of processing in response to any of these commands.

The buffer 12 is a memory in which data to be written to the tape 23 and data read from the tape 23 are accumulated. For example, the buffer 12 is formed of a DRAM (Dynamic Random Access Memory). In addition, the buffer 12 includes multiple buffer segments, and each of the buffer segments stores a dataset that is a unit of data for writing to and reading from the tape 23. The channel 13 is a communication path for use to send the head 4 data to be written to the tape 23 and to receive from the head 14 data read from the tape 23.

The head 14 writes information to the tape 23 or reads information from the tape 23 while the tape 23 is moving in the longitudinal direction.

The motor 15 rotates the reels 21 and 22. Incidentally, although FIG. 1 illustrates one rectangle for the motor 15, two motors 15 in total are preferably provided for the reels 21 and 22, respectively, on a one-to-one basis.

Meanwhile, the controller 16 controls the whole of the tape drive 10. For example, the controller 16 controls data writing to the tape medium and data reading from the tape 23 in accordance with commands received by the host I/F 11. In addition, the controller 16 controls the head position control system 17 and the motor driver 18.

The head position control system 17 is a system to track desired one or more wraps. Here, the term wrap means a group of tracks on the tape 23. When the wrap needs to be switched to another one, the head 14 also needs to be switched electrically. Thus, the head position control system 17 controls such a switching operation.

The motor driver 18 drives the motor 15. If the two motors 15 are used as described above, two motor drivers 18 are provided as well.

In the embodiment of the present invention, even when receiving a synchronization command, the tape drive 10 having the above configuration continuously transports the tape 23 without executing backhitch, and writes next data to the same wrap. This method of writing data to the same wrap without executing backhitch is referred to as SWBF (Same Wrap Backhitchless Flush) or Skip Sync, and is called SWBF in the following description.

In this regard, instead of using a high tape speed in consideration of reduction in the write time alone, this embodiment chooses an appropriate tape speed from tape speeds lower than the high tape speed, and uses the appropriate tape to shorten the entire write time by reducing the number of backhitches.

To be more specific, in order to achieve the target value of the performance in reading, the tape drive 10 calculates the number of times SWBF is executable within a certain range to be monitored and the number of times backhitch occurs within the certain range. Then, based on these numbers, the tape drive 10 calculates a time T(x) required to write data with a speed level x of the tape 23, that is, each of multiple speed levels prepared stepwise. In this way, the maximum performance can be obtained by choosing a speed level that minimizes T(x).

Hereinafter, a specific method for calculating T(x) will be explained.

Figure 2:
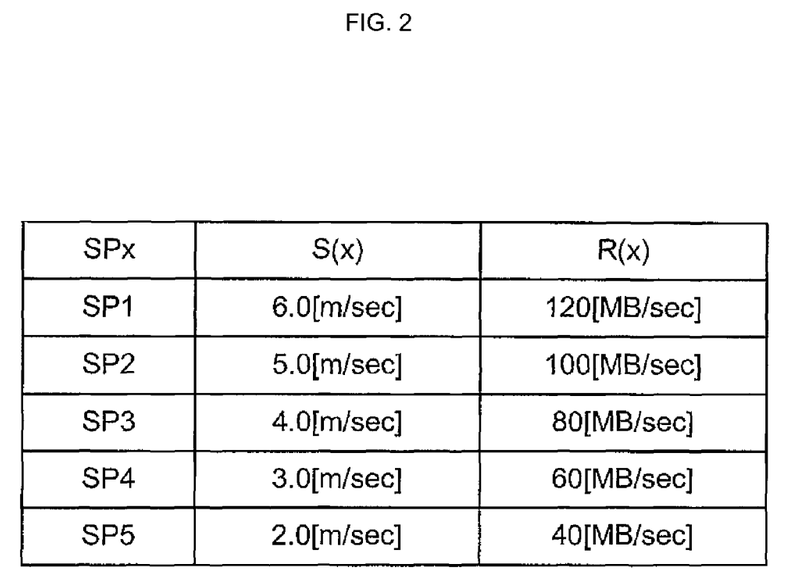
FIG. 2 is a diagram illustrating an example of correspondence among a speed level, a tape speed and a read data rate.

First of all, S(x) and R(x) are defined as variables used to calculate T(x). Specifically, when SPx denotes a speed level x of the tape 23 that is one of multiple speed levels prepared stepwise, S(x) is a tape speed [m/sec] at SPx and R(x) is a write data rate [MB/sec] at SPx.

FIG. 2 illustrates values SPx, S(x) and R(x) of the fifth generation LTO as one example of these values.

Meanwhile, the tape drive 10 calculates a time T_backhitch(x) [sec] that is required to execute backhitch with SPx by using the following formula. Here, A [m/sec$^2$] denotes a rate of acceleration of the tape 23, and is 10 [m/sec$^2$], for example. In addition, s [sec] is a time required until the tape speed becomes stable after a change thereof, and is 1.0 [sec], for example.

$$T\_backhitch(x)=(S(x)/A)*4+s*2$$

Moreover, using the following formula, the tape drive 10 calculates a maximum length Max_Length [m] of tolerable idle transport for achieving a target read data rate Target_Data_Rate by data reading with the maximum speed SP1.

$$Max\_Length=Max\_Interval*S(1)$$

Here, Max_Interval [sec] is a maximum time of tolerable idle transport for achieving the target read data rate Target_Data_Rate by data reading with the maximum speed SP1, and is calculated by using the following formula. Here, Target_Data_Size [MB] denotes a data amount of data targeted for monitoring of Target_Data_Rate.

$$Max\_Interval=Target\_Data\_Size/Target\_Data\_Rate-Target\_Data\_Size/R(1)$$

In the present embodiment, when receiving data of Target_Data_Size targeted for performance monitoring from the host 30 and writing the data to the tape 23, the tape drive 10 acquires and stores Average_Interval [sec], Average_Tx [MB] and n as history information. Then, with use of such history information, the tape drive 10 determines an appropriate tape speed based on the latest values of the history information.

Average_Interval denotes an average time required to receive next data after completion of a synchronization and to get ready to start writing of the next data to the tape, Average_Tx denotes an average amount of data transfer between synchronizations, and n denotes the number of synchronizations during writing of Target_Data_Size.

After acquisition of these kinds of information, the tape drive 10 calculates a maximum value m(x) of the number of synchronizations in which SWBF is executable among synchronizations performed until completion of writing data of Target_Data_Size, by using the following formula.

$$m(x)=Max\_Length/l(x)$$

Here, l(x) [m] denotes an idle transport length after a synchronization while the tape 23 is transported with the tape speed corresponding to SPx, and is calculated by using the following formula.

$$l(x)=Average\_Interval*S(x)$$

Further, the tape drive 10 calculates a time T_swbf(x) [sec] required to write data of Average_Tx by SWBF, by using the following formula.

$$T\_swbf(x)=Average\_Tx/R(X)+Average\_Interval$$

Furthermore, the tape drive 10 calculates a time T_normal (x) [sec] required to write data of Average_Tx by Normal Write (a write method with backhitch), by using the following formula.

$$T\_normal(x) = T\_backhitch(x) + Average\_Tx/R(x)$$

After acquiring these values, the tape drive 10 calculates the time T(x) required to write data of Target_Data_Size by using the following formula.

$$T(x) = m(X) * T\_swbf(x) + (n - m(X)) * T\_normal(x)$$

Then, when data is written with a tape speed that minimizes T(x), high performance is obtained.

Figure 3A:
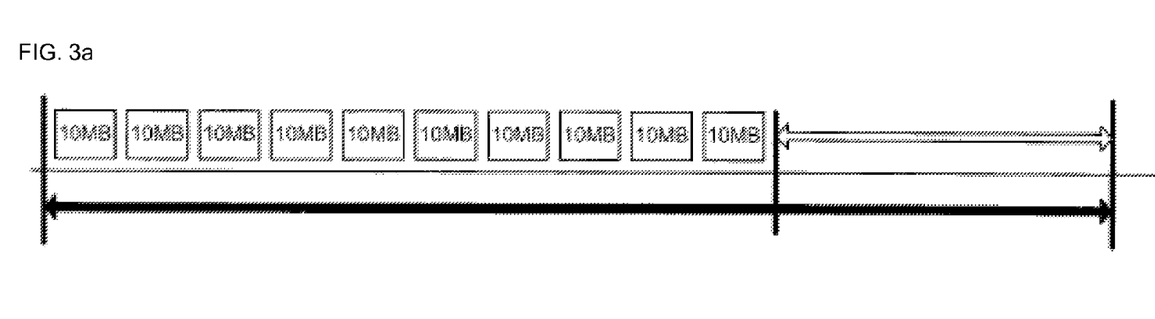
FIGS. 3a and 3b are diagrams for explaining a method for calculating $T(x)$ according to embodiments of the present invention.
Figure 3B:
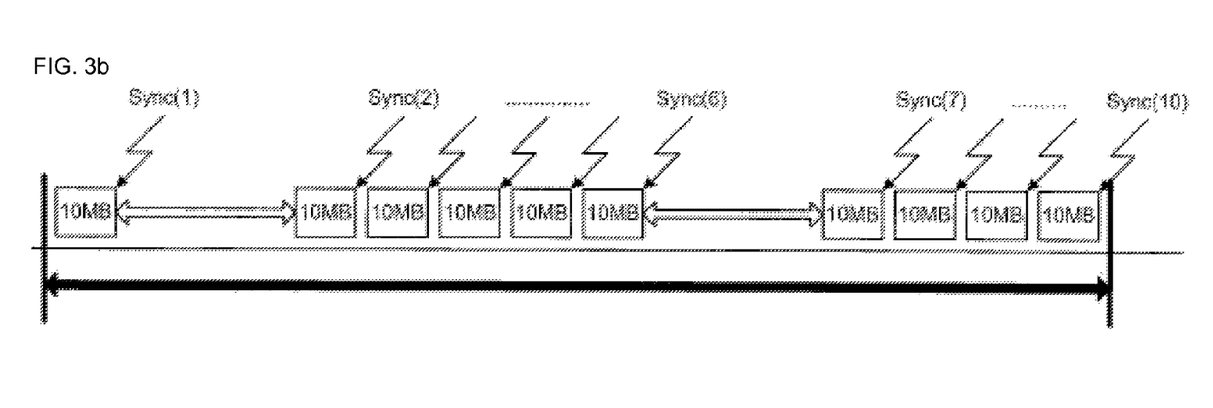

FIGS. 3*a* and 3*b* are a conceptual diagram specifically illustrating this calculation method. Note that, in the drawing, Target_Data_Size is 100 MB, Average_Tx is 10 MB and n is 10.

FIG. 3(*a*) shows a case where Normal write is executed with a maximum tape speed S(1) corresponding to SP1.

In synchronizations, 10 MB of data is firstly written, then backhitch is executed, and then next 10 MB of data is written immediately after the 10 MB of data firstly written. As a result, a portion having the Max_Length [m] where no data is written (a portion indicated by a white thick arrow in the drawing) is generated within a range (a range indicated by a black thick arrow in the drawing) where a certain amount of data needs to be written to maintain performance in reading.

On the other hand, FIG. 3(*b*) shows a case where SWBF is executed with the tape speed S(x) corresponding to SPx.

In this case, an idle transport is performed as indicated by a white thick arrow after 10 MB of data is written by a first synchronization Sync(1). Here, since the idle transport is performed over the length l(x), the idle transport cannot be performed unlimitedly within the range (the range indicated by the black thick arrow in the drawing) where the certain amount of data needs to be written to maintain performance in reading. For this reason, in the drawing, the number of idle transports executable within the range is set to 2, and backhitch is executed from after writing of 10 MB of data by a second synchronization Sync(2) to after writing of 10 MB of data by a fifth synchronization Sync(5). Then, after 10 MB of data is written by a sixth synchronization Sync(6), an idle transport is executed as shown by a white thick arrow. Thereafter, backhitch is executed from after writing of 10 MB of data by a seventh synchronization Sync(7) to after writing of 10 MB of data by a ninth synchronization Sync(9).

Figure 4:
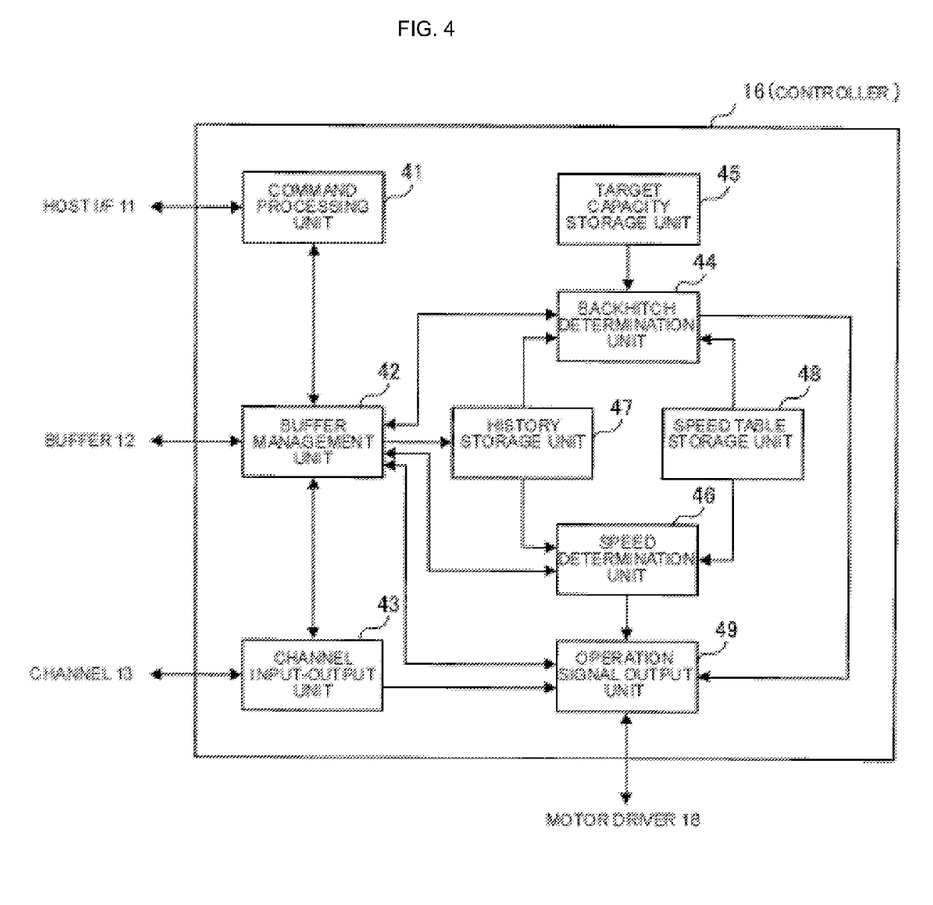
FIG. 4 is a block diagram illustrating a functional configuration example of a controller according to embodiments of the present invention.

Next, description will be provided for a functional configuration of the controller 16 to achieve the above operation.

FIG. 4 is a block diagram illustrating a functional configuration example of the controller 16.

As illustrated in the drawing, the controller 16 includes a command processing unit 41, a buffer management unit 42, a channel input-output unit 43, a backhitch determination unit 44, a target capacity storage unit 45, a speed determination unit 46, a history storage unit 47, a speed table storage unit 48, and an operation signal output unit 49.

Among them, the command processing unit 41 receives commands from the host I/F 11. Here, the commands include a Write command to store data into the buffer 12, and a synchronization command to write data stored in the buffer 12 to the tape 23 (a WriteFM command or the like), for example.

The buffer management unit 42 prepares data in the buffer 12 when the command processing unit 41 receives a Write command. In addition, when the command processing unit 41 receives a synchronization command, the buffer management unit 42 reads data from the buffer 12 and outputs the data to the channel input-output unit 43. The channel input-output unit 43 outputs data read from the buffer 12 by the buffer management unit 42 to the channel 13, and stores data received from the channel 13 into the buffer 12.

The backhitch determination unit 44 determines whether or not to execute backhitch in order to write the target capacity to the tape 23 and to ensure the target read data rate. The target capacity storage unit 45 stores information on the target capacity to be written out of a nominal capacity of the tape 23.

The speed determination unit 46 determines the tape speed to ensure the target read data rate in the case where the backhitch determination unit 44 determines to execute backhitch. In the present embodiment, the speed determination unit 46 is provided as an example of an acquisition unit to acquire the target read data rate and also an example of a determination unit to determine a speed for transporting a tape medium.

The history storage unit 47 stores history information on data writing in the past. Here, the history information includes information on past records of a length of idle transportation of the tape 23, the number of synchronizations, a time interval between synchronizations, a data size (transaction size) written in response to a synchronization, and the like. Instead, these kinds of information may be stored as the history information only for a range where a certain amount of data is written before a current write location. In the present embodiment, the history storage unit 47 is provided as an example of a storage unit to store the history information.

The speed table storage unit 48 stores a speed table including the multiple speed levels prepared stepwise for the tape 23, and correspondence of each speed level with a tape speed and a read data rate, which are associated with the speed level.

The operation signal output unit 49 outputs to the motor driver 18 a signal instructing execution of an operation determined by the backhitch determination unit 44 or the speed determination unit 46.

Next, operations of the controller 16 will be described.

Figure 5:
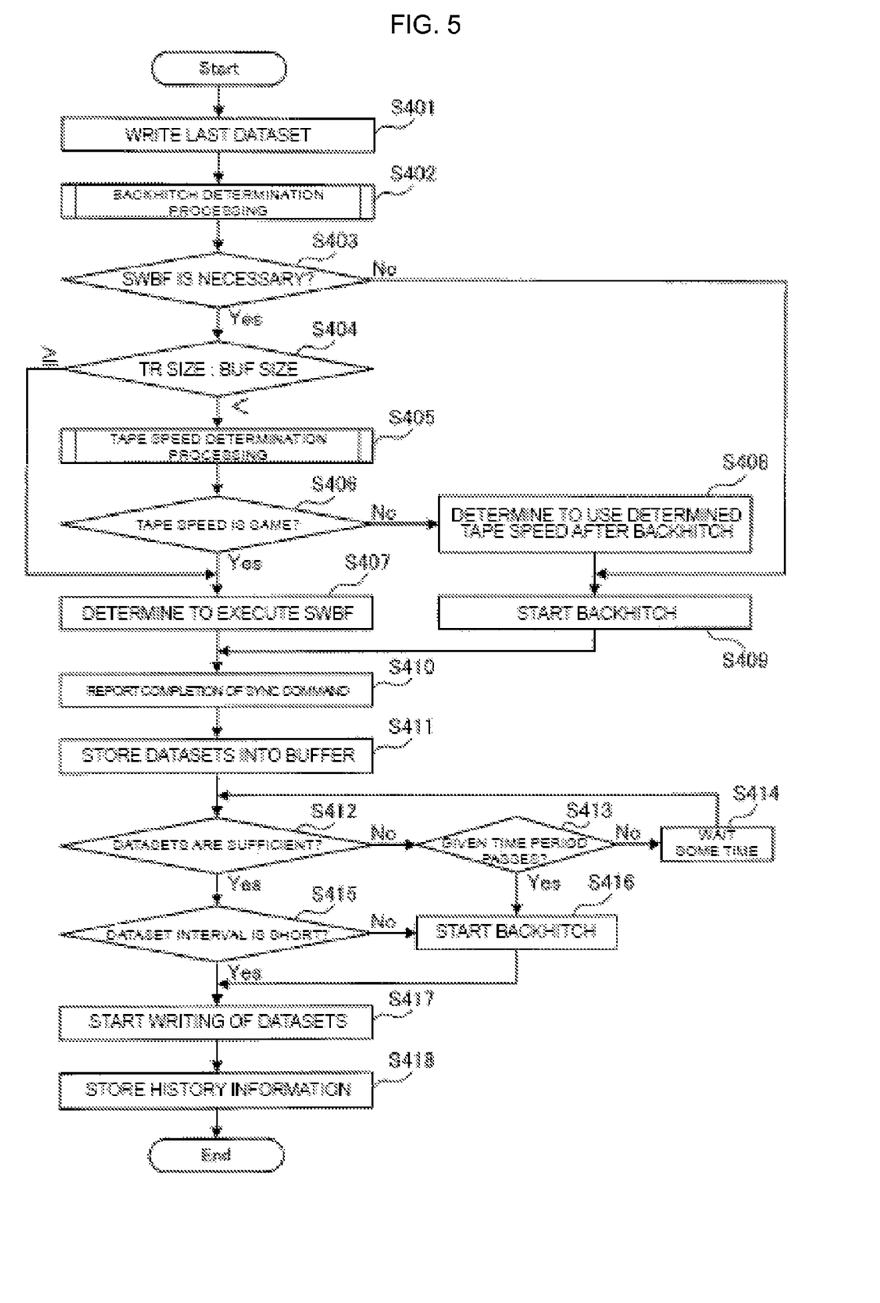
FIG. 5 is a flowchart illustrating an operation example of the controller according to embodiments of the present invention.

FIG. 5 is a flowchart illustrating an operation example of the controller 16. Here, the operation example is assumed to start during writing of datasets in the buffer 12. to the tape 23 in response to a synchronization command.

In the controller 16 during such writing of the datasets, the buffer management unit 42 reads the last dataset from the buffer 12, and passes the dataset to the channel input-output unit 43, and the channel input-output unit 43 writes the passed dataset to the tape 23 (step 401).

At this time, since the buffer management unit 42 is informed that the last dataset is written to the tape 23, the buffer management unit 42 instructs the backhitch determination unit 44 to determine whether or not to execute backhitch. In response to this, the backhitch determination unit 44 performs backhitch determination processing of determining whether or not to execute backhitch from the standpoints of writing the target capacity to the tape 23 and ensuring the target read data rate (step 402). Note that, the details of the backhitch determination processing will be described later. Then, the determination result in the backhitch determination processing is outputted to the operation signal output unit 49.

In response to this, the operation signal output unit 49 determines whether or not the determination result indicates execution of SWBF (skipping of backhitch) (step 403).

If the determination result does not indicate execution of SWBF, the operation signal output unit 49 outputs a signal instructing a start of backhitch to the motor driver 18 (step 409).

On the other hand, if the determination result indicates execution of SWBF, the operation signal output unit 49 returns control to the buffer management unit 42, and the buffer management unit 42 compares the transaction size (expressed as "TR size" in the drawing) and the size of the buffer 12 (expressed as "BUF size" in the drawing) with each other (step 404). Here, an average value of the sizes of the last three transactions may be used as the transaction size.

Then, if the transaction size is smaller than the size of the buffer 12, the buffer management unit 42 instructs the speed determination unit 46 to determine a new speed of the tape 23. In response to this, the speed determination unit 46 performs tape speed determination processing of determining a new speed of the tape 23 (step 405). Note that the details of the tape speed determination processing will be also described later.

Thereafter, if the current tape speed is different from the tape speed determined in this tape speed determination processing, SWBF is not executed, but backhitch is executed and the tape speed is changed. Specifically, the speed determination unit 46 determines whether or not the tape speed determined in step 405 is equal to the current tape speed (step 406). Then, if these tape speeds are equal to each other, execution of SWBF is determined (step 407). In contrast, if these tape speeds are not equal to each other, it is determined that the tape speed determined in step 405 is used after backhitch, and the operation signal output unit 49 is informed of the determination result (step 408). In response to this, the operation signal output unit 49 outputs a signal instructing start of backhitch to the motor driver 18 (step 409). After the backhitch, the speed of the tape 23 is changed.

On the other hand, if the transaction size is equal to or larger than the size of the buffer 12 in step 404, execution of SWBF is determined (step 407).

Upon determination to execute SWBF or start of backhitch as described above, information to that effect is returned to the command processing unit 41, and the command processing unit 41 reports the completion of the synchronization command to the host 30 (step 410).

Thereafter, the command processing unit 41 receives the next dataset, and passes the dataset to the buffer management unit 42, and the buffer management unit 42 stores the received data into the buffer 12 (step 411).

Then, the buffer management unit 42 determines whether or not datasets sufficient to start new writing are already received (step 412). When it is determined that the sufficient datasets are not received yet, the buffer management unit 42 advances to determining whether or not a given time period passes after the completion of step 406 (step 413). When the given time period does not pass yet, the buffer management unit 42 waits for some time (step 414) and then again makes the determination in step 412. When the given time period passes, the buffer management unit 42 passes control to the operation signal output unit 48, and the operation signal output unit 48 outputs a signal instructing start of backhitch to the motor driver 18 (step 416). In contrast, when it is determined in step 412 that the sufficient datasets are already received, the buffer management unit 42 determines whether or not the interval between the current location of the head 14 and the location of the end of the dataset lastly written is short (step 415). For example, the determination may be made on whether or not the interval is shorter than a threshold of the dataset interval.

In the case where the given time period passes after the completion of step 410, and where the interval between the current location of the head 14 and the location of the end of the dataset lastly written is long at a time after the reception of sufficient datasets, the buffer management unit 42 passes control to the operation signal output unit 49. Then, the operation signal output unit 49 outputs a signal instructing start of backhitch to the motor driver 18 (step 416). Then, the buffer management unit 42 reads the datasets from the buffer 12, and passes the datasets to the channel input-output unit 43, and the channel input-output unit 43 writes the datasets to the tape 23 (step 417).

On the other hand, if the interval between the current location of the head 14 and the location of the end of the dataset lastly written is short, backhitch is not executed, but the buffer management unit 42 reads the datasets from the buffer 12, and passes the datasets to the channel input-output unit 43, and the channel input-output unit 43 writes the datasets to the tape 23 (step 417).

Thereafter, the channel input-output unit 43 informs the buffer management unit 42 of the history information on data writing, and the buffer management unit 42 stores the history information into the history storage unit 47 (step 418). Here, the history information may include: Accumulated_Interval that is a cumulative total of dataset intervals generated within a range where the unit data (target data) closest to the current write location is written; the tape speed $S(x)$ at the above writing; Average_Interval (an example of time history information) that is an average time required to receive next data after completion of a synchronization and to get ready to start writing of the next data to the tape; Average_Tx (an example of data amount history information) that is an average amount of data transferred between synchronizations; and n (an example of count history information) that is the number of synchronizations performed until completion of writing of Target_Data_Size.

Figure 6:
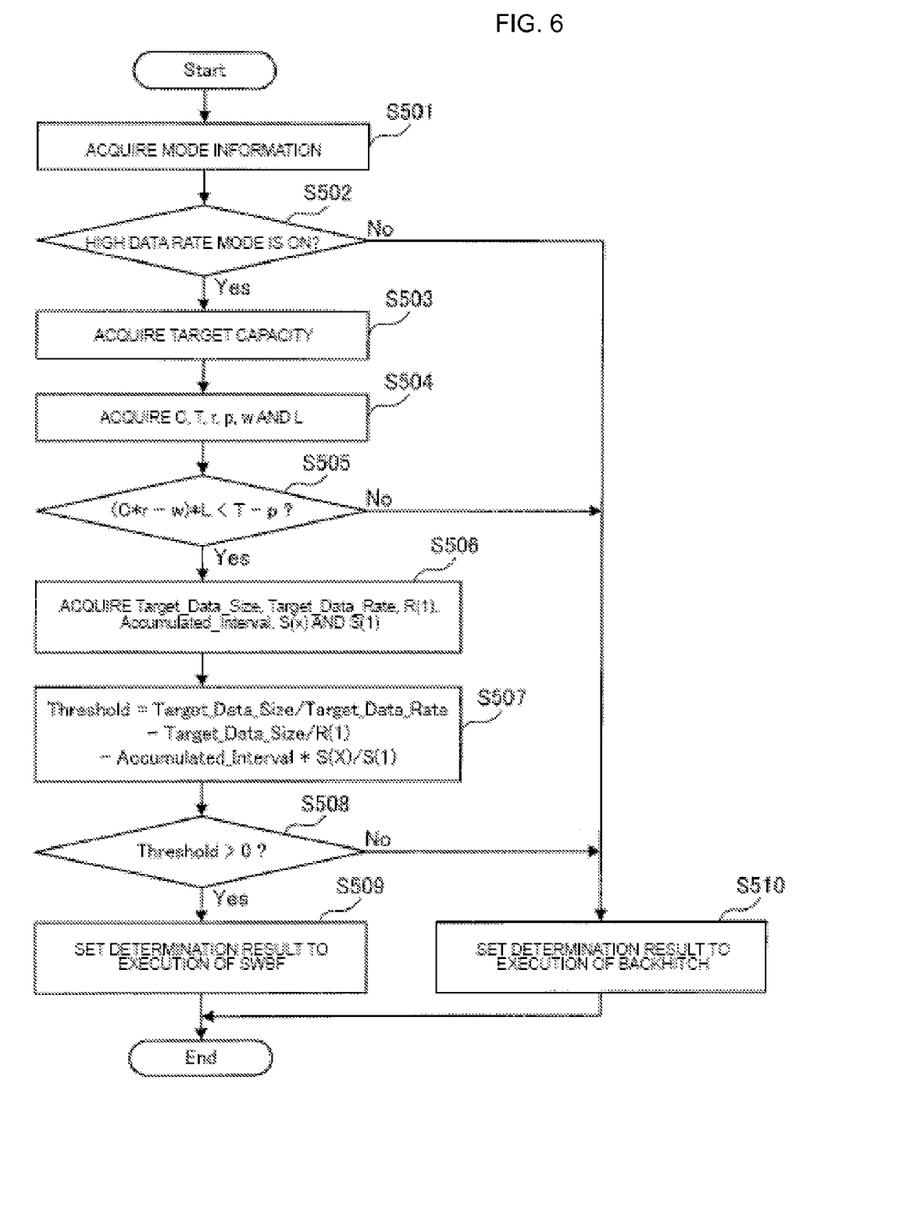
FIG. 6 is a flowchart illustrating an operation example of a backhitch determination unit in the controller according to embodiments of the present invention.

Next, the details of the backhitch determination processing in step 402 will be described.

FIG. 6 is a flowchart illustrating a flow of the backhitch determination processing.

Firstly, the backhitch determination unit 44 acquires mode information stored in an unillustrated memory (step 501). Then, the backhitch determination unit 44 determines whether or not the mode information indicates the high data rate mode (step 502). Here, the high data rate mode is a mode supposed to write a target capacity that is smaller than a nominal capacity.

When the mode information is determined to indicate the high data rate mode as a result, the backhitch determination unit 44 acquires the target capacity from the target capacity storage unit 46 (step 503). Additionally, the backhitch determination unit 44 acquires a total number of datasets C, an effective tape length T, an SWBF margin ratio r, a last data set location p, a last dataset number w, and a dataset length L (step 504). Among them, C, T and L may be acquired from setting information internally retained in advance. Moreover, r may be obtained by dividing the target capacity acquired in step 503 by the nominal capacity. Further, since p and w can be obtained when the last dataset is written in step 401, these values may be acquired as p and w.

Subsequently, the backhitch determination unit 44 determines whether or not the values thus acquired satisfy a conditional expression "$(C \times r - w) \times L < T - p$" (step 505).

If the conditional expression is satisfied, the backhitch determination unit 44 acquires Target_Data_Size, Target_Data_Rate, $R(1)$, Accumulated_Interval, $S(x)$ and $S(1)$ (step 506). Among them, Target_Data_Size and Target_Data_Rate may be acquired from the setting information internally retained in advance. In addition, $R(1)$ and $S(1)$ may be acquired by searching the speed table stored in the speed table storage unit 48. Moreover, the values stored in the history storage unit 47 in step 418 may be acquired as Accumulated_Interval and $S(x)$.

Then, the backhitch determination unit 44 obtains Threshold by a formula "Threshold=Target_Data_Size/Target_Data_Rate-Target_Data_Size/R(1)-AccumulatedInterval*S(x)/S(1)" (step 507), and determines whether or not Threshold is larger than 0 (step 508).

If Threshold is determined to be larger than 0 as a result, a determination result is set to execution of SWBF (step 509).

On the other hand, in each of the case where it is determined that the mode information does not indicate the high data rate mode in step 502, the case where it is determined that the conditional expression "(C×r−w)×L<T−p" is not satisfied in step 505, and the case where Threshold is determined to be equal to or smaller than 0 in step 508, the determination result is set to execution of backhitch (step 510).

Figure 7:
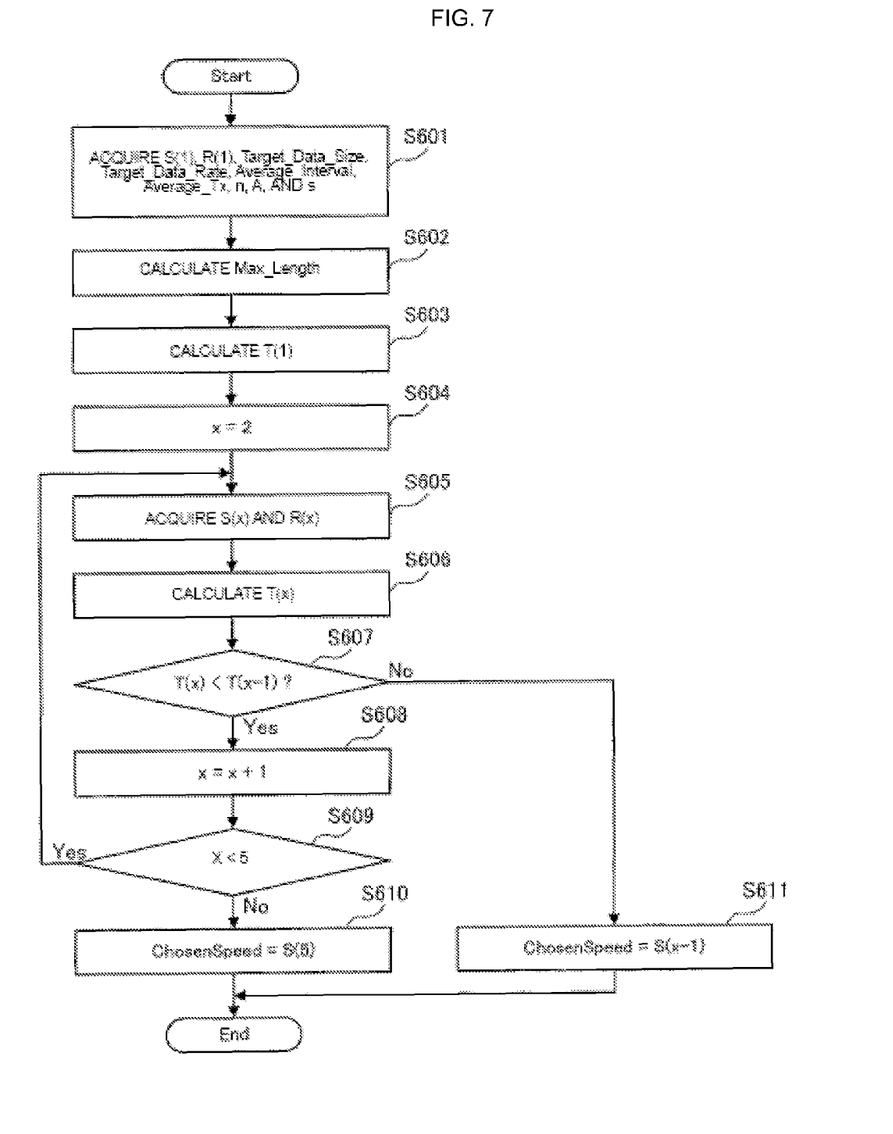
FIG. 7 is a flowchart illustrating an operation example of a speed determination unit in the controller according to embodiments of the present invention.

Next, the details of the tape speed determination processing in step 405 will be described.

FIG. 7 is a flowchart illustrating a flow of the tape speed determination processing. Note that, this operation example is configured to additionally determine which of SWBF or backhitch to execute at a synchronization timing even though a capacity requirement for SWBF is satisfied.

Firstly, the speed determination unit 46 acquires S(1), R(1), Target_Data_Size, Target_Data_Rate, Average_Interval, Average_Tx, n, A, and s (step 601). Among them, Target_Data_Size, Target_Data_Rate, A, and s may be acquired from the setting information internally retained in advance. In addition, S(1) and R(1) may be acquired by searching the speed table stored in the speed table storage unit 48. Moreover, the values stored in the history storage unit 47 in step 418 may be acquired as Average_Interval, Average_Tx, and n.

Then, the speed determination unit 46 calculates Max_Length (step 602). Specifically, the speed determination unit 46 first calculates Max_Interval from "Max_Interval=Target_Data_Size/Target_Data_Rate−Target_Data_Size/R(1)" using R(1), Target_Data_Size and Target_Data_Rate acquired in step 601. Moreover, the speed determination unit 46 calculates Max_Length from "Max_Length=Max_Interval*S(1)" using S(1) acquired in step 601.

Thereafter, the speed determination unit 46 calculates T(1) (step 603). Specifically, the speed determination unit 46 first calculates T_backhitch(1) from "Tbackhitch(1)=(S(1)/A)*4+s*2" using S(1), A and s acquired in step 601. Then, the speed determination unit 46 calculates T_normal(1) from "T_normal(1)=T_backhitch(1)+Average_Tx/R(1)" using R(1) and Average_Tx acquired in step 601 as well. Moreover, the speed determination unit 46 calculates T_swbf(1) from "T_swbf(1)=Average_Tx/R(1)+Average_Interval" using Average_Tx and Average_Interval acquired in step 601 as well. In addition, the speed determination unit 46 calculates l(1) from "l(1)=Average_Interval*S(1)" using S(1) and Average_Interval acquired in step 601 as well. Further, the speed determination unit 46 calculates m(1) from "m(1)=Max_Length/l(1)" using Max_Length calculated in step 602. Furthermore, the speed determination unit 46 calculates T(1) from "T(1)=m(1)*T_swbf(1)+(n−m(1))*T_normal(1)" using n acquired in step 601.

After that, the speed determination unit 46 assigns 2 to the variable x indicating the speed level (step 604).

Next, the speed determination unit 46 performs processing of evaluating T(x) in each of the cases where the variable x is 2 to 5.

To be more specific, the speed determination unit 46 firstly acquires S(x) and R(x) (step 605). Here, S(x) and R(x) may be acquired by searching the speed table stored in the speed table storage unit 48.

Then, the speed determination unit 46 calculates T(x) (step 606). Specifically, the speed determination unit 46 calculates T_backhitch(x) from "T_backhitch(x)=(S(x)/A)*4+s*2" using S(x) acquired in step 605 and A and s acquired in step 601. In addition, the speed determination unit 46 calculates T_normal(x) from "T_normal(x)=T_backhitch(x)+Average_Tx/R(x)" using R(x) acquired in step 605 and Average_Tx acquired in step 601. Moreover, the speed determination unit 46 calculates T_swbf(x) from "T_swbf(x)=Average_Tx/R(x)+Average_Interval" using R(x) acquired in step 605 and Average_Tx and Average_Interval acquired in step 601. Further, the speed determination unit 46 calculates l(x) from "l(x)=Average_Interval*S(x)" using S(x) acquired in step 605 and Average_Interval acquired in step 601. Furthermore, the speed determination unit 46 calculates m(x) from "m(x)=Max_Length/l(x)" using Max_Length calculated in step 602. Still further, the speed determination unit 46 calculates T(x) from "T(x)=m(x)*T_swbf(x)+(n−m(x))*T_normal(x)" using n acquired in step 601. Note that, m(x)*T_swbf(x) is an example of a first required time, and (n−m(x))*T_normal(x) is an example of a second required time. Moreover, m(x) is an example of a first count number, and (n−m(x)) is an example of a second count number. Additionally, T_swbf(x) is an example of a first time, and T_normal(x) is an example of a second time.

Thereafter, the speed determination unit 46 determines whether or not T(x) is smaller than T(x−1) (step 607). In summary, since the highest performance can be obtained by transporting the tape 23 with the tape speed S(x) in the case where T(x) is minimized, the speed determination unit 46 performs processing of finding out such T(x).

If T(x) is determined to be smaller than T(x−1) as a result, the speed determination unit 46 increments x by 1 (step 608). Then, the speed determination unit 46 determines whether or not the incremented x is smaller than 5 (step 609). In other words, the speed determination unit 46 determines whether or not there is a speed lower than S(x), because the speed levels prepared for the tape drive 10 are 1 to 5 in the present embodiment. Then, if the incremented x is smaller than 5, the processing returns to step 605.

If steps 605 to 609 are iterated in the above way and in step 609, x reaches 5 and it is determined that there is no lower speed any more, then a variable ChosenSpeed expressing a chosen speed is set to S(5) that is the lowest speed among the speeds registered in the speed table storage unit 48 (step 610). On the other hand, assume that T(x) is determined not to be smaller than T(x−1) in step 607. In this case, the variable ChosenSpeed expressing the chosen speed is set to S(x−1) corresponding to T(x−1) that is the last one before T(x) under evaluation at this time (step 611).

The description of the present embodiment is completed hereinabove.

As described above, the present embodiment is configured to choose a tape speed that can achieve a target read data rate even though idle transport occurs due to SWBF, and to write data while transporting the tape 23 with the chosen tape speed. In this way, the present embodiment can ensure the target read data rate while obtaining high performance in writing.

Note that, although the backhitch is executed prior to a change in the speed of the tape 23 in the present embodiment, the present embodiment may be configured to change the speed of the tape 23 without executing backhitch.

In addition, the above description has been provided for the case where the present embodiment is applied to the tape drive 10 configured to change the tape speed stepwise, but the present embodiment is applicable to a tape drive device capable of changing the tape speed in a stepless manner.

Here, the present invention may be entirely implemented by hardware, or may be entirely implemented by software. Instead, the present invention may be implemented by both of hardware and software. The present invention may also be implemented as a computer, a data processing system, or a computer program. This computer program can be provided in the form stored in a computer-readable medium. Here, a medium considered usable as the above medium is an electric, magnetic, optical, electromagnetic, infrared or semiconductor system (apparatus or device), or removal medium. In addition, examples of the computer-readable medium include a semiconductor, a solid state storage device, a magnetic tape, a removable computer diskette, a random access memory (RAM), a read-only memory (ROM), a rigid magnetic disc, and an optical disc. Examples of the optical disc at the present time include a compact disc read-only memory (CD-ROM), a compact disc read/write (CD-R/W) and a DVD.

The present invention has been described by using the embodiments hereinabove. The technical scope of the present invention, however, is not limited to the foregoing embodiments. It is apparent to those skilled in the art to modify the foregoing embodiments variously or to employ an alternative embodiment without deviating from the sprit and scope of the present invention.

The invention claimed is:

1. An apparatus of controlling transportation of a tape medium during data writing to the tape medium, comprising:
   a buffer;
   a controller that performs operations, the operations comprising:
      determining whether to execute a backhitch operation in response to writing a data set to tape from the buffer;
      determining whether a transaction size at which data is transferred from the buffer to the tape is less than a buffer size in response to determining not to execute the backhitch;
      determining a new speed of the tape in response to determining that the transaction size is less than the buffer size;
      determining whether a current speed is different from the determined new speed; and
      initiating a backhitch in response to determining that the current tape speed is different from the determined new speed.

2. The apparatus of claim 1, wherein the operations further comprise:
   executing a same wrap backhitchless flush in response to the current tape speed being the same as the determined new speed.

3. The apparatus of claim 1, wherein the operations further comprise:
   executing a same wrap backhitchless flush in response to the transaction size being greater than the buffer size.

4. The apparatus of claim 1, wherein the operations further comprise:
   changing the tape speed to the determined new tape speed in response to completing the initiated backhitch.

5. The apparatus of claim 1, wherein the operations further comprise:
   in response to receiving a next data set in the buffer, determining whether there are sufficient data sets in the buffer to start new writing to the tape;
   determining whether a time interval has passed waiting for there to be sufficient data sets to start the new writing to the tape; and
   initiating the backhitch in response to determining that the time interval has passed.

6. The apparatus of claim 1, wherein the operations further comprise:
   in response to determining that there are sufficient data sets to start new writing before the time interval has passed, determining whether a data set interval between a current location of a tape head and a location of an end of a last written data set is less than a threshold data set interval;
   starting writing the data sets in the buffer to the tape in response to determining that the data set interval is less than the threshold data interval.

7. The apparatus of claim 6, wherein the operations further comprise:
   performing a backhitch operation in response to determining that the data set interval is greater than the threshold data interval.

8. A computer readable medium device including a program executed to control transportation of a tape medium during data writing from a buffer to the tape medium and perform operations, the operations comprising:
   determining whether to execute a backhitch operation in response to writing a data set to tape from the buffer;
   determining whether a transaction size at which data is transferred from the buffer to the tape is less than a buffer size in response to determining not to execute the backhitch;
   determining a new speed of the tape in response to determining that the transaction size is less than the buffer size;
   determining whether a current speed is different from the determined new speed; and
   initiating a backhitch in response to determining that the current tape speed is different from the determined new speed.

9. The computer readable medium device of claim 8, wherein the operations further comprise:
   executing a same wrap backhitchless flush in response to the current tape speed being the same as the determined new speed.

10. The computer readable medium device of claim 8, wherein the operations further comprise:
    executing a same wrap backhitchless flush in response to the transaction size being greater than the buffer size.

11. The computer readable medium device of claim 8, wherein the operations further comprise:
    changing the tape speed to the determined new tape speed in response to completing the initiated backhitch.

12. The computer readable medium device of claim 8, wherein the operations further comprise:
    in response to receiving a next data set in the buffer, determining whether there are sufficient data sets in the buffer to start new writing to the tape;
    determining whether a time interval has passed waiting for there to be sufficient data sets to start the new writing to the tape; and
    initiating the backhitch in response to determining that the time interval has passed.

13. The computer readable medium device of claim 8, wherein the operations further comprise:
    in response to determining that there are sufficient data sets to start new writing before the time interval has passed, determining whether a data set interval between a current location of a tape head and a location of an end of a last written data set is less than a threshold data set interval;

starting writing the data sets in the buffer to the tape in response to determining that the data set interval is less than the threshold data interval.

14. The computer readable medium device of claim 13, wherein the operations further comprise:
performing a backhitch operation in response to determining that the data set interval is greater than the threshold data interval.

15. A method of controlling transportation of a tape medium during data writing from a buffer to the tape medium, comprising:
determining whether to execute a backhitch operation in response to writing a data set to tape from the buffer;
determining whether a transaction size at which data is transferred from the buffer to the tape is less than a buffer size in response to determining not to execute the backhitch;
determining a new speed of the tape in response to determining that the transaction size is less than the buffer size;
determining whether a current speed is different from the determined new speed; and
initiating a backhitch in response to determining that the current tape speed is different from the determined new speed.

16. The method of claim 15, further comprising:
executing a same wrap backhitchless flush in response to the current tape speed being the same as the determined new speed.

17. The method of claim 15, further comprising:
executing a same wrap backhitchless flush in response to the transaction size being greater than the buffer size.

18. The method of claim 15, further comprising:
changing the tape speed to the determined new tape speed in response to completing the initiated backhitch.

19. The method of claim 15, further comprising:
in response to receiving a next data set in the buffer, determining whether there are sufficient data sets in the buffer to start new writing to the tape;
determining whether a time interval has passed waiting for there to be sufficient data sets to start the new writing to the tape; and
initiating the backhitch in response to determining that the time interval has passed.

20. The method of claim 15, further comprising:
in response to determining that there are sufficient data sets to start new writing before the time interval has passed, determining whether a data set interval between a current location of a tape head and a location of an end of a last written data set is less than a threshold data set interval;
starting writing the data sets in the buffer to the tape in response to determining that the data set interval is less than the threshold data interval.

21. The method of claim 20, further comprising:
performing a backhitch operation in response to determining that the data set interval is greater than the threshold data interval.

\* \* \* \* \*